(12) United States Patent
Bordeau et al.

(10) Patent No.: US 10,261,808 B2
(45) Date of Patent: *Apr. 16, 2019

(54) ACCESS OPERATION WITH DYNAMIC LINKING AND ACCESS OF DATA WITHIN PLURAL DATA SOURCES

(71) Applicant: International Business Machines Corporation, Armonk, NY (US)

(72) Inventors: Eric A. Bordeau, Apex, NC (US); Gili Mendel, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/268,814

(22) Filed: Sep. 19, 2016

(65) Prior Publication Data

US 2017/0003987 A1 Jan. 5, 2017

Related U.S. Application Data

(63) Continuation of application No. 14/573,209, filed on Dec. 17, 2014, now Pat. No. 9,513,876.

(51) Int. Cl.
*G06F 8/30* (2018.01)
*G06F 9/54* (2006.01)
(Continued)

(52) U.S. Cl.
CPC .......... *G06F 9/44521* (2013.01); *G06F 8/315* (2013.01); *G06F 9/54* (2013.01);
(Continued)

(58) Field of Classification Search
CPC ... G06F 8/315; G06F 8/24; G06F 8/54; G06F 17/30; G06F 9/54; G06F 9/44521;
(Continued)

(56) References Cited

U.S. PATENT DOCUMENTS 6,766,329 B1 7/2004 Nicholson
7,433,853 B2 10/2008 Brockway et al.
(Continued)

FOREIGN PATENT DOCUMENTS

CN 101201842 A 6/2008
CN 101763378 A 6/2016

OTHER PUBLICATIONS

Gerald Taber, Dynamically Linking to Data Record—Using While MYSQL Result Data Names to Single File or Anchored URL Results, http://forums.mysql.com, MySQL Forums, Nov. 29, 2012, 4 pages.
(Continued)

*Primary Examiner* — Marina Lee
(74) *Attorney, Agent, or Firm* — Maeve Carpenter; Edell, Shapiro & Finnan, LLC

(57) ABSTRACT

A present invention embodiment includes a system with at least one processor for accessing data. The system creates a rule including one or more conditional expressions to link a first data object of a first data source to a second data object of a second data source. Data of the first data object is retrieved from the first data source in accordance with a request for the first data object. The system processes the rule to retrieve data of the second data object from the second data source that satisfies the one or more conditional expressions of the rule. Results for the request are produced by merging the data retrieved from the first and second data objects. Embodiments of the present invention further include a method and computer program product for accessing data in substantially the same manner described above.

21 Claims, 10 Drawing Sheets

(51) Int. Cl.
*G06F 17/30* (2006.01)
*G06F 9/445* (2018.01)

(52) U.S. Cl.
CPC ........ *G06F 17/30* (2013.01); *G06F 17/30312* (2013.01); *G06F 17/30507* (2013.01); *G06F 17/30545* (2013.01)

(58) Field of Classification Search
CPC ......... G06F 17/30312; G06F 17/30517; G06F 17/30545
USPC .................................. 717/100–116, 162–167
See application file for complete search history.

(56) References Cited

U.S. PATENT DOCUMENTS

| | | | |
|---|---|---|---|
| 7,849,064 B2 | 12/2010 | Hindle | |
| 7,941,444 B2 | 5/2011 | Cragun | |
| 7,966,312 B2 | 6/2011 | Nolan et al. | |
| 8,135,750 B2 | 3/2012 | Shur | |
| 8,140,445 B2 | 3/2012 | Meng | |
| 8,285,701 B2 | 10/2012 | Swart | |
| 8,316,045 B1 | 11/2012 | Breau et al. | |
| 8,548,981 B1 | 10/2013 | Bhattacharjee | |
| 8,615,731 B2 | 12/2013 | Doshi | |
| 8,626,795 B2 | 1/2014 | Jacobson et al. | |
| 9,513,876 B2* | 12/2016 | Bordeau | G06F 8/315 |
| 9,633,052 B2* | 4/2017 | Seetharaman | G06F 17/30292 |
| 9,912,816 B2* | 3/2018 | Ristock | H04M 3/5234 |
| 2002/0013782 A1 | 1/2002 | Ostroff | |
| 2004/0260702 A1* | 12/2004 | Cragun | G06F 17/30873 |
| 2006/0010090 A1 | 1/2006 | Brockway | |
| 2006/0129605 A1* | 6/2006 | Doshi | G06F 8/24 |
| 2009/0018999 A1* | 1/2009 | Petri | G06F 17/30011 |
| 2009/0077012 A1 | 3/2009 | Glowacki | |
| 2009/0094270 A1 | 4/2009 | Alirez | |
| 2009/0125540 A1 | 5/2009 | Dellinger | |
| 2009/0292663 A1 | 11/2009 | Meng | |
| 2010/0063971 A1 | 3/2010 | Cragun | |
| 2011/0010379 A1 | 1/2011 | Gilderman | |
| 2011/0087647 A1 | 4/2011 | Signorini | |
| 2011/0113030 A1 | 5/2011 | Hunter | |
| 2013/0086107 A1 | 4/2013 | Genochio | |
| 2013/0132441 A1 | 5/2013 | Petri | |
| 2013/0144843 A1 | 6/2013 | Srivastava | |
| 2013/0185330 A1 | 7/2013 | Li | |
| 2014/0129554 A1 | 5/2014 | Gray | |
| 2014/0258261 A1 | 9/2014 | Singh | |
| 2014/0379681 A1 | 12/2014 | Puligundla | |
| 2015/0026167 A1 | 1/2015 | Neels | |
| 2015/0339312 A1 | 11/2015 | Lin | |
| 2016/0216946 A1* | 7/2016 | Bordeau | G06F 8/315 |

OTHER PUBLICATIONS

Server side JavaScript rules, RapidApps, https://developer.ibm.com/rapidapps/docs/logic/serverjs/, accessed Nov. 6, 2014, 2 pages.
Getting started, RapidApps, https://developer.ibm.com/rapidapps/docs/getting-started/, accessed Oct. 9, 2014, 31 pages.
International Search Report and Written Opinion of the International Searching Authority, Application No. PCT/IB2015/059499, dated Mar. 23, 2016, 10 pages.
List of IBM Patents or Patent Applications or Patent Applications Treated as Related, Sep. 19, 2016, 1 page.

* cited by examiner

```
1   {
2        "Type": "Press intervien",
3        "Status": "Completed",
4        "Product Family": "Application Services",
5        "Location": "Remote",
6        "Employee": {
7              "_id": xxx
8              "notes-id": xxx
9              "name": xxx
10             "email": xxx
11             "floor": xxx
12             "is-employee": xxx
13             "bio": xxx
14             "id": xxx
15             "org-title": xxx
16             "office-phone": xxx
17             "location": xxx
18             "building": xxx
19             "office": xxx
20             "uid": xxx
21       },
22       "Description":
23       "Checkpoint":
24       "Alliance Owner":
25       "Activity Date":
```

FIG.10

ACCESS OPERATION WITH DYNAMIC LINKING AND ACCESS OF DATA WITHIN PLURAL DATA SOURCES

CROSS-REFERENCE TO RELATED APPLICATIONS

This application is a continuation of U.S. patent application Ser. No. 14/573,209, entitled "ACCESS OPERATION WITH DYNAMIC LINKING AND ACCESS OF DATA WITHIN PLURAL DATA SOURCES" and filed Dec. 17, 2014, now U.S. Pat. No. 9,513,876, the disclosure of which is incorporated herein by reference in its entirety.

BACKGROUND

1. Technical Field

Present invention embodiments relate to data access, and more specifically, to performing a data access operation with dynamic linking and access of data within plural data sources.

2. Discussion of the Related Art

A Web or mobile device application accesses data of an enterprise system in order to be applied to a real business or other scenario. For example, a business application developer may create an application that tracks employee activities. The application may define an activity collection of data records within an initial data source with various properties or attributes (e.g., Type, Status, Product Family, Location, Employee, Description, Checkpoint, Alliance Owner, Activity Date, etc.). The Employee property may include a string comprising first and last names. An employees collection of data records may be stored in a registry of employees or other data source external of the initial data source. The employees collection of data records includes various properties or attributes to represent employee profiles (e.g., first and last names, electronic mail (e-mail) address, mobile telephone number, etc.).

In order for the application to track employee activities, employee profile information from the external data source is required (e.g., e-mail, mobile telephone number, etc.) to drive notifications. Since the activity and employee collections are separate, the application is required to join these collections directly in order to render information and trigger notifications. Relational databases enable joining of information from database tables by employing hard foreign keys to link data between the database tables and a special join mechanism to merge data from those database tables. However, a business or other application may access data lacking structured database schemas, and require a linking scheme for the data with greater flexibility.

SUMMARY

According to one embodiment of the present invention, a system includes at least one processor for accessing data. The system creates a rule including one or more conditional expressions to link a first data object of a first data source to a second data object of a second data source. Data of the first data object is retrieved from the first data source in accordance with a request for the first data object. The system processes the rule in response to retrieving the data of the first data object in order to retrieve data of the second data object from the second data source. The data of the second data object retrieved from the second data source satisfies the one or more conditional expressions of the rule. Results for the request for the first data object are produced by merging the data retrieved from the first and second data objects. Embodiments of the present invention further include a method and computer program product for accessing data in substantially the same manner described above.

BRIEF DESCRIPTION OF THE SEVERAL VIEWS OF THE DRAWINGS

Generally, like reference numerals in the various figures are utilized to designate like components.

FIG. 10 illustrates data merged from records of source and target data objects in response to processing a request for data of a source data object according to an embodiment of the present invention.

DETAILED DESCRIPTION

Present invention embodiments enable access operations (e.g., initiated from business or other applications) to dynamically link and access data from plural data sources, and provide a linking scheme for the data with enhanced flexibility. Present invention embodiments enable specification of rules (e.g., having a zero to many relationship) to dynamically link data between the plural data sources. When a request for data of a source data object of a local data store is received, a corresponding rule is executed to determine the presence of linked data available from a target data object of an external data store. When the linked data is present, linked data records from the target data object are merged or nested with a corresponding data record from the source data object and a single array of data records is returned in response to the request. The results are provided as if the resulting data is from one data source.

Accordingly, present invention embodiments avoid the need to employ a JOIN operation (e.g., from a query with a SELECT operation) to merge data from different data sources. Since the data sources are basically meshed into a hybrid collection by embodiments of the present invention, one data source may be accessed and a data record including a mesh of information from that data source and one or more other data sources is provided, thereby significantly simplifying application programming. Although two or more data objects may be accessed based on an associated rule, a request is directed toward only one of the data objects. Further, present invention embodiments enable the rule that links data to be changed at anytime (e.g., without the need to update an application). In addition, since the rule is tied to a source data object, the data linking and access may be performed for any requests for that source data object received from any entities (e.g., any application, user, etc.).

Figure 1:
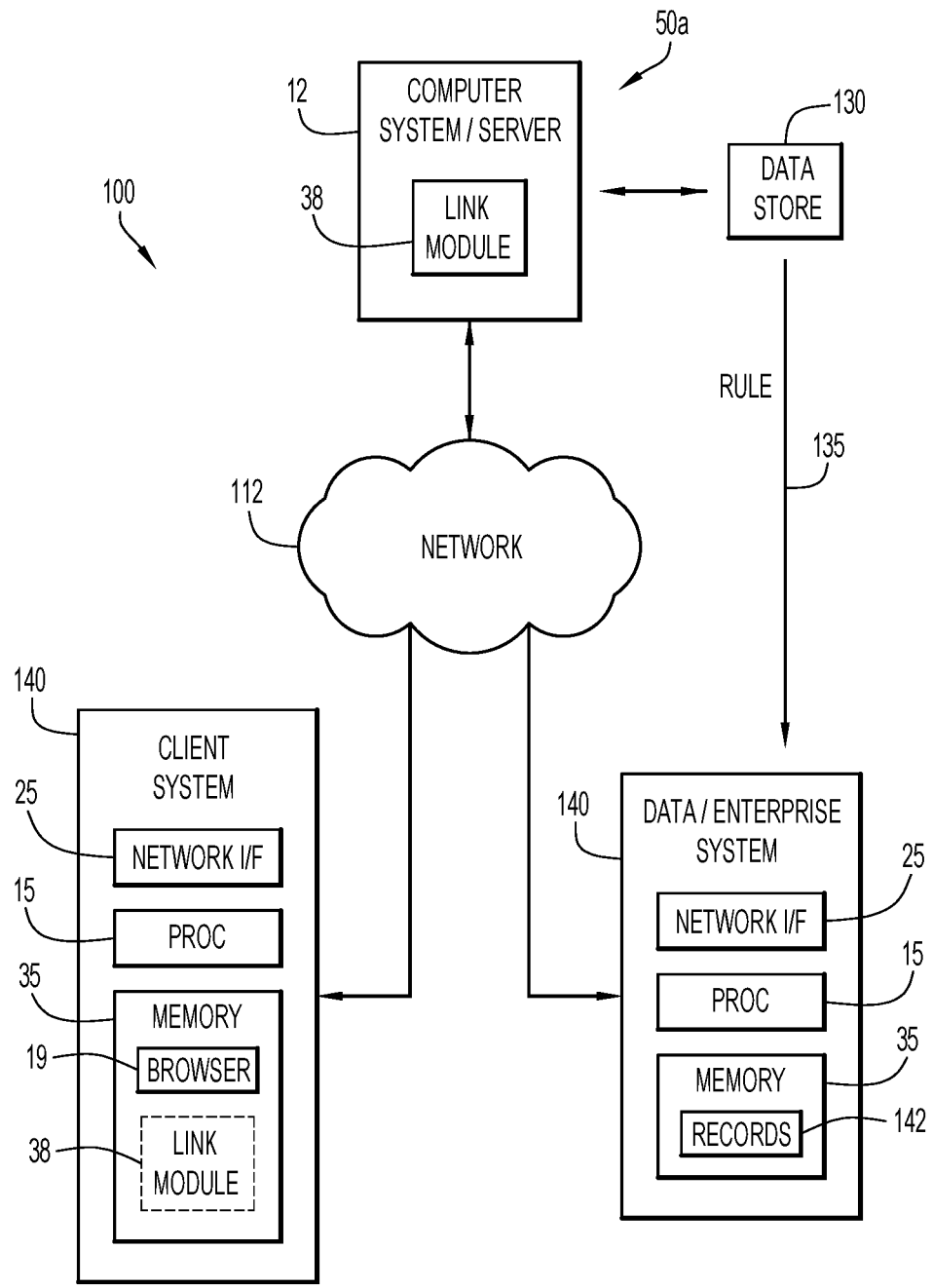
FIG. 1 is a diagrammatic illustration of an example computing system of an embodiment of the present invention.

An example computing system of present invention embodiments is illustrated in FIG. 1. Specifically, a computing system 100 includes a computing environment 50a, one or more client or end-user systems 114, and a data system 140. Computing environment 50a includes one or more computer systems/servers 12, and one or more data stores 130. Data stores 130 may store various information (e.g., data objects, rules, etc.), and may be implemented by any conventional or other database or storage unit. Data system 140 may include various data storage units (e.g., memory, databases, etc.) to store data records 142 containing any desired information. By way of example, data system 140 may be an enterprise system with data records 142 storing various information for an enterprise (e.g., corporate information, employee information, etc.).

Computer systems/servers 12, client systems 114, data stores 130, and data system 140 may be remote from each other and communicate over a network 112. The network may be implemented by any number of any suitable communications media (e.g., wide area network (WAN), local area network (LAN), Internet, Intranet, etc.). Alternatively, computer systems/servers 12, client systems 114, data stores 130, and data system 140 may be local to each other, and communicate via any appropriate local communication medium (e.g., local area network (LAN), hardwire, wireless link, Intranet, etc.).

Computer systems/servers 12 may be implemented by any type of server systems (e.g., database server systems, application server systems, etc.), and include a link module 38 to perform access operations with dynamic linking and accessing of data from plural data sources (e.g., data stores 130 and data system 140) as described below. Computer systems/servers 12 may be implemented by any conventional or other computer systems preferably equipped with a processing unit 16, one or more system memories 28, a network adapter 20, Input/Output (I/O) interfaces 22, a display 24, optional external devices 14 (e.g., a keyboard, mouse or other input device), and any commercially available and custom software (e.g., server/communications software, operating system, NODE.JS or other server platform or environment, link module, etc.) as described below for FIG. 3.

Client systems 114 enable users to interact with computer systems/servers 12 (e.g., via a browser 19 or other interface) to access data from data stores 130 and/or data system 140, and may be implemented by any suitable computing devices (e.g., mobile device (e.g., smartphone, tablet, laptop, notebook, etc.), end-user computer system, etc.). The client systems or other computing devices (e.g., mobile device, end-user computer system, etc.) may present a graphical user (e.g., GUI, etc.) or other interface (e.g., command line prompts, menu screens, etc.) to solicit information from users, and may provide displays and/or reports including resulting requested data from data stores 130 and/or data system 140.

Alternatively, one or more client systems 114 may perform access operations with dynamic linking and access of data from plural data sources (e.g., data stores 130 and data system 140) when operating as a stand-alone unit. In a stand-alone mode of operation, the client system stores or has access to data stores (e.g., internal or local data stores, data stores 130, etc.), and includes link module 38 to perform access operations with dynamic linking and access of data from plural data sources (e.g., internal or local data stores, data stores 130, data system 140, etc.) in substantially the same manner described below. The graphical user (e.g., GUI, etc.) or other interface (e.g., command line prompts, menu screens, etc.) solicits information from a corresponding user pertaining to requested data, and may provide displays and/or reports including the resulting requested data.

Initially, one or more rules 135 are established (e.g., via link module 38 and a computer system/server 12) that specify conditions to link local or source data objects (e.g., of data stores 130) with remote or target data objects of an external system (e.g., data or enterprise system 140). The rules are preferably implemented in a JAVASCRIPT computing language for direct execution to implement dynamic linking, but may be implemented in any desired computing or other language, notation, or format. In this manner, the rule may include any desired conditions or conditional or other expressions (e.g., mathematical, logical, conditional, etc.) for linking the source and target data objects.

When a request for data of a local or source data object is received by computer system/server 12, the requested data from the source data object is retrieved from one or more corresponding data stores 130 and formatted based on requirements of the requesting entity (e.g., application, etc.). In addition, a corresponding rule 135 is executed to dynamically retrieve data records 142 of data or enterprise system 140 that are linked to the requested source data object. The data records from enterprise system 140 are formatted and merged or joined with the requested data retrieved from the source data object to produce results for the request formatted to meet requirements of the requesting entity as described below.

Thus, present invention embodiments produce results that satisfy the requirements of the request (e.g., perform dynamic joining) regardless of the type of data store, and even if the type of data store changes (e.g., a data store changes from a Lightweight Directory Access Protocol (LDAP) to a relational database management system (RDBMS)). In addition, present invention embodiments merge the data retrieved from data stores 130 and data system 140 into a single dataset. For example, the request may require a query to a LDAP data store and a database that produces two datasets based on rules linking these data sources. The two datasets are merged to produce a single dataset in response to the request.

Client systems 114 and data system 140 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., browser/interface module 19, data/database management software, link module 38, etc.).

Computer systems/servers 12, client systems 114, and data system 140 may include one or more modules or units (e.g., browser 19, link module 38, etc.) to perform the various functions of present invention embodiments described below. These various modules (e.g., link module 38, etc.) may be implemented by any combination of any quantity of software and/or hardware modules or units, and may reside within memory of these systems for execution by a corresponding system processor or processing unit.

The linking of data of present invention embodiments may be applied to various computing environments and scenarios. For example, present invention embodiments may be applied to application tools to enable development and execution of applications hosted in cloud computing environments (e.g., business applications, mobile device applications, etc. that require data from different data sources) and accessible from various end-user devices (e.g., mobile devices, end-user computer systems, etc.). These tools generally employ templates to develop the applications, and enable importation of data (e.g., from files, spreadsheets, etc.). In this case, the data linking of present invention embodiments enables these tools to develop applications for users with minimal application development experience and/or database knowledge.

Figure 2:
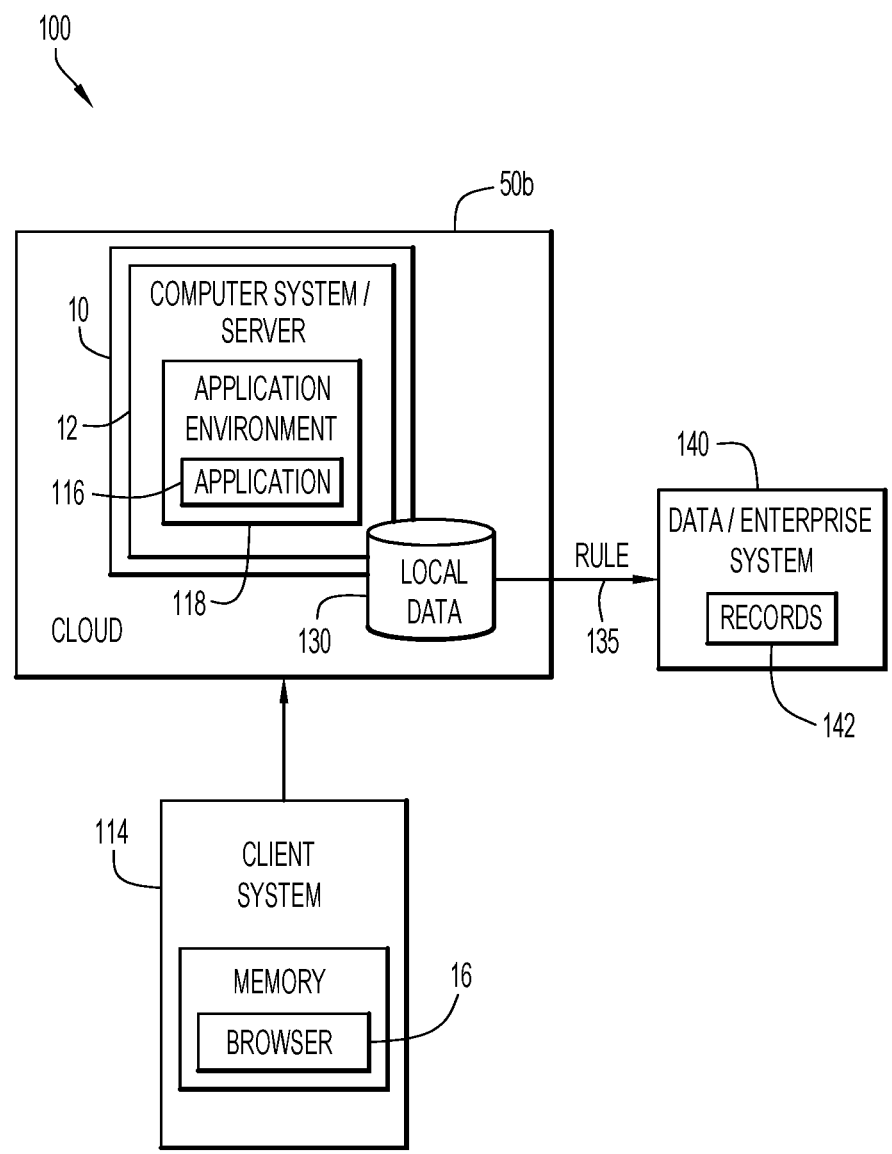
FIG. 2 is a diagrammatic illustration of the computing system of FIG. 1 employing a cloud computing environment according to an embodiment of the present invention.

An example of computing system 100 employing a cloud computing environment 50b is illustrated in FIG. 2. Specifically, computing system 100 includes one or more client or end-user systems 114, data or enterprise system 140, and cloud computing environment 50b. Cloud computing environment 50b includes one or more cloud computing nodes 10, and one or more data stores 130. Cloud computing nodes 10 may include one or more computer systems/servers 12, where data stores 130 may be in communication with any computer systems/servers 12 within cloud computing environment 50b. Client systems 114, data stores 130, and data or enterprise system 140 are substantially similar to the client systems, data stores, and data system described above.

Computer systems/servers 12, client systems 114, and enterprise computer system 140 may be remote from each other and communicate over network 112 (FIG. 1) as described above. Computer systems/servers 12 may include one or more virtual servers and/or machines, and provide an application environment 118 to develop and/or execute corresponding applications 116 (e.g., business applications, mobile device applications, etc.) that access and process data of data stores 130 and/or data system 140. Applications 116 are typically hosted by and executed within cloud computing environment 50b. Application environment 118 and a corresponding application 116 execute as one or more processes of a corresponding virtual machine or server. Computer systems/servers 12 may utilize any suitable platform to provide the application environment for developing and/or executing applications 116 (e.g., operating systems, NODE.JS or other server platform, etc.).

Client systems 114 enable users to interact with computer systems/servers 12 to develop and/or execute applications 116 that access data from data stores 130 and/or data or enterprise system 140 as described above. One or more rules 135 are established that specify conditions to link local or source data objects (e.g., of data stores 130) with remote or target data objects of an external system (e.g., data or enterprise system 140) as described above. The rules are preferably implemented in a JAVASCRIPT computing language for direct execution to implement dynamic linking, but may be implemented in any desired computing or other language, notation, or format. The rule may include any conditions or conditional or other expressions for linking the source and target data objects as described above.

When an application 116 executing in a corresponding application environment 118 requests data from a source data object, the requested data is retrieved from one or more corresponding data stores 130 and the corresponding rule 135 is executed to dynamically retrieve linked data records 142 of data or enterprise system 140. The data records from data or enterprise system 140 are merged or joined with the requested data retrieved from the local data object to produce results for the request as described below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
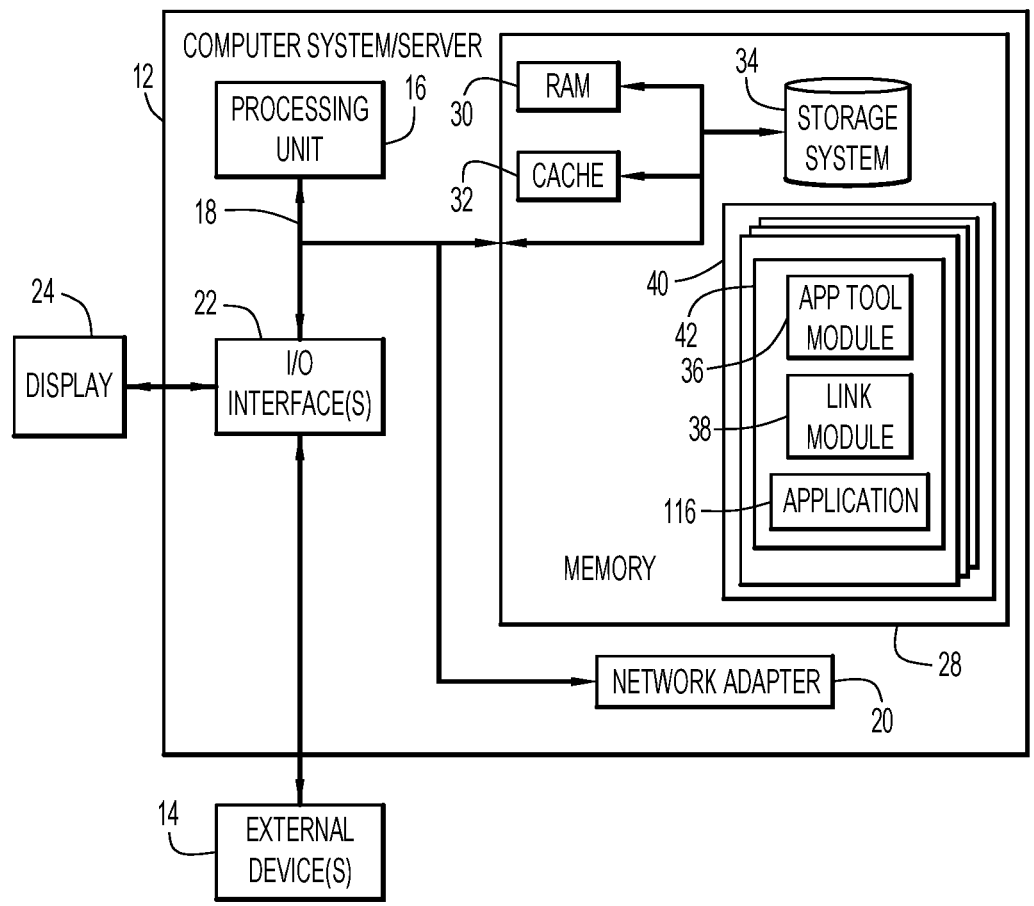
FIG. 3 depicts an example computer system/server of the computing systems of FIGS. 1 and 2 according to an embodiment of the present invention.

Referring now to FIG. 3, a schematic of an example computer system/server 12 of computing environment 50a and cloud computing environment 50b is shown. An example cloud computing node 10 of cloud computing environment 50b may include computer system/server 12. This cloud computing node is only one example of a suitable cloud computing node and is not intended to suggest any limitation as to the scope of use or functionality of embodiments of the invention described herein. Regardless, the cloud computing node is capable of being implemented and/or performing any of the functionality set forth hereinabove.

Computer system/server 12 of computing environments 50a, 50b is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network personal computers (PCs), minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 is shown in the form of a general-purpose computing device. The components of computer system/server 12 may include, but are not limited to, one or more processors or processing units 16, system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Program modules 42 include data link module 38 to provide linking and access of data from an external system in accordance with present invention embodiments as described below.

In addition, program modules 42 may include one or more applications utilizing data link module 38 to link and access external data for that particular application. By way of example, program modules 42 may include an application tool module 36 to enable development of business or other applications 116 requiring external data by users with minimal or no application development experience. Application tool module 36 further provides an application environment 118 to enable execution of applications 116.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
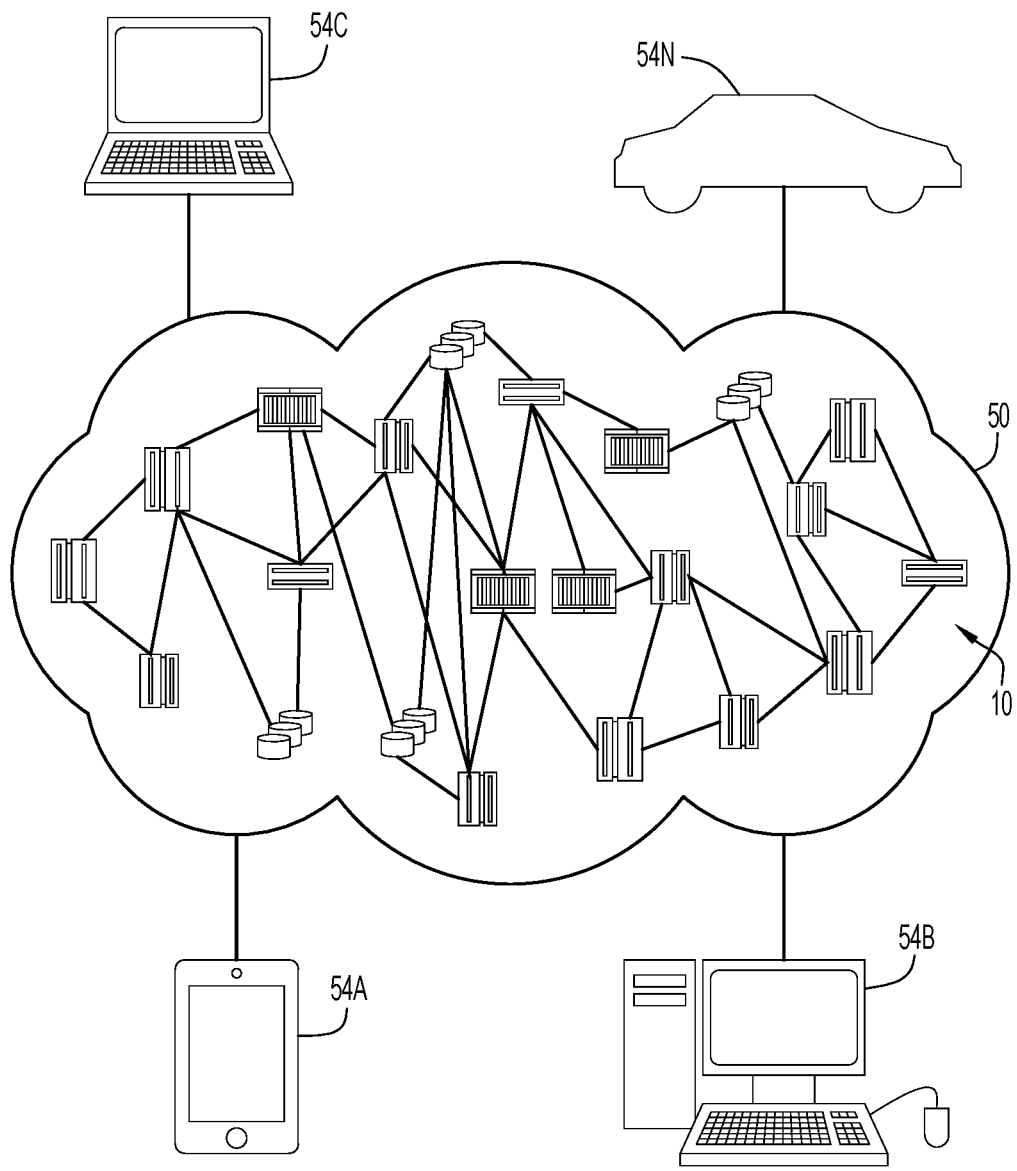
FIG. 4 depicts an example of the cloud computing environment of the computing system of FIG. 2 according to an embodiment of the present invention.

Referring now to FIG. 4, illustrative cloud computing environment 50b is depicted. As shown, cloud computing environment 50b comprises one or more cloud computing nodes 10 with which local or remote computing devices (e.g., client systems 114) used by cloud consumers (e.g., e.g., personal digital assistant (PDA) or cellular telephone 54A, desktop computer 54B, laptop computer 54C, and/or automobile computer system 54N, etc.) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50b to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50b can communicate with any type of computerized device over any type of network and/or network addressable connection (e.g., using a web browser).

Figure 5:
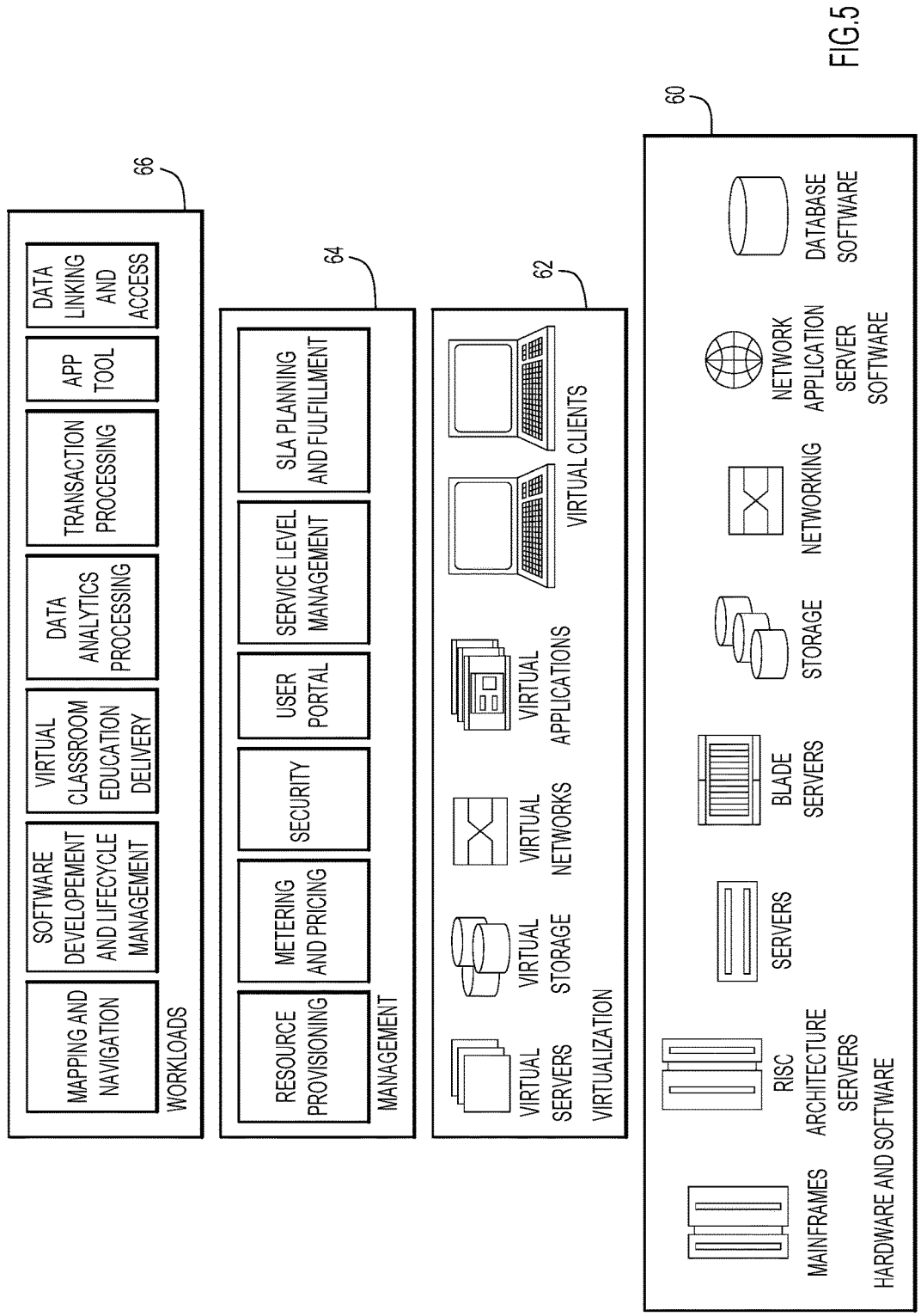
FIG. 5 depicts abstraction model layers of the cloud computing environment of FIG. 4 according to an embodiment of the present invention.

Referring now to FIG. 5, a set of functional abstraction layers provided by cloud computing environment 50b (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic data access and linking of present invention embodiments. In addition, workloads layer 66 may provide one or more workloads and functions utilizing the dynamic data access and linking of present invention embodiments to link and access external data. By way of example, workloads layer 66 may provide the application tool to enable development and/or execution of business or other applications 116 requiring external data. However, the dynamic data access and linking of present invention embodiments (e.g., and the corresponding applications utilizing the dynamic data access and linking) may reside in any of one or more of the abstraction layers provided by cloud computing environment 50b.

Figure 6:
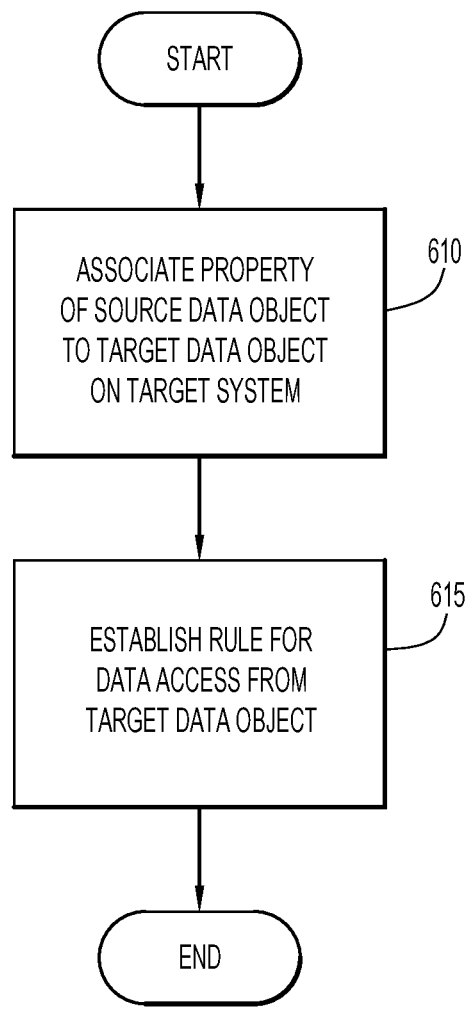
FIG. 6 is a procedural flowchart illustrating a manner of associating data objects and establishing rules for dynamically linking and accessing data of those data objects for a data access operation according to an embodiment of the present invention.

A manner of linking data between plural data sources (e.g., via data link module 38, a computer system/server 12 of computing environment 50a, 50b, and/or a client system 114) according to an embodiment of the present invention is illustrated in FIG. 6. Initially, data objects or collections may include a plurality of data records and reside on source data systems and target data systems, where the source and target data objects may be registered or otherwise known to the source data system. By way of example, the source data system may include computer system/server 12 of the computing or cloud environments 50a, 50b (FIGS. 1 and 2) with source data objects stored on one or more data stores 130 of those environments, while the target data system may be an external data system storing target data objects (e.g., target data objects within a registry or other data source of data or enterprise system 140 (FIGS. 1 and 2)).

The source data object includes one or more properties or attributes, and a plurality of data records each including values for those properties or attributes. The target data object similarly includes one or more properties or attributes, and a plurality of data records each including values for those properties or attributes. The source and target data objects are selected, and a property or attribute of the source data object is linked or associated with the target data object at step 610. This enables data records 142 of data or enterprise system 140 that satisfy an associated rule to be retrieved and inserted into the linked property of a corresponding data record of the source data object as described below.

The linking may be accomplished in response to information entered by a user on a client system 114. By way of example, text information may be entered to identify and select the property of the source data object and the corresponding target data object. Alternatively, the association may be provided graphically. In this case, source and target data objects may be selected from a display of client system 114 (e.g., from a list, text box, or other input field via a mouse, keyboard, or other input device) and represented by graphical objects indicating the corresponding properties. The desired property of the source data object within the corresponding displayed graphical object may be linked or connected to the displayed graphical object representing the desired target data object via actuation of a mouse, keyboard, or other input device (e.g., a mouse or other input device may be utilized to draw a line or other connector connecting the linked portions on the display).

For example, a user interface screen 700 (FIG. 7) may be presented on client system 114 (e.g., via link module 38 and a computer system/server 12 of computing environment 50a, 50b) to establish a link or association between source and target data objects. User interface screen 700 may be provided for an application tool (e.g., provided by application tool module 36 and a computer system/server 12) or other scenario that utilizes the dynamic linking and access of present invention embodiments, and may be presented in response to selection from a navigation menu. User interface screen 700 may include a data object section 705 specifying desired data objects and a link section 707 enabling linking of the data objects. Interface screen 700 includes an activities data object or collection 710 serving as the source data object (e.g., stored in data stores 130). By way of example only, the activities data object may include the following properties: Type, Status, Product Family, Location, Employee, Description, Checkpoint, Alliance Owner, and Activity Date. Data records of the activities data object may each include values for these properties.

Interface screen 700 may further include an employees data object or collection 720 serving as the target data object. The employees data object may reside in a registry or other data source of data or enterprise system 140 and include data records 142. By way of example only, the employees data object or collection may include the following properties: internal Id (id), System User Id (e.g., for a NOTES or other system), Name, E-mail, Floor (e.g., of a building), Is-Employee (e.g., indicating employee status), Bio, Id, Org-Title (e.g., organization title), Office-Phone, Location, Building, Office, and internal User Id (uid). Data records 142 of the employees data object may each include values for these properties. However, a data collection may include any quantity of any types of properties or attributes and any quantity of data records having any values for those properties.

The activities and employees data objects are specified in data section 705, while graphical objects representing activities data object 710 and employees data object 720 are provided in link section 707 of user interface screen 700. By way of example only, an Employee property 715 of activities data object 710 is linked to employees data object 720 (e.g., as shown by connector 730 in FIG. 7). This connection may be accomplished by employing a mouse or other input device to draw the connector from Employee property 715 of activities data object 710 to employees data object 720 on the display. This enables data records 142 of employees data object 720 of enterprise system 140 that satisfy an associated rule to be retrieved and inserted into the linked Employee property 715 of a corresponding data record of activities data object 710 as described below.

Once the property or attribute of the source data object is linked or associated with the target data object, a rule is created for the association at step 615 (FIG. 6). The rule preferably includes one or more conditions or conditional or other expressions for retrieval of zero or more data records from the target data object. The expressions typically include a source and/or target property, an operator (e.g., conditional (e.g., equal to, greater than, less than, etc.), mathematical, logical, etc.) and a corresponding value (e.g., of a source or target property, a constant value, etc.). The rule is preferably implemented in a JAVASCRIPT computing language for direct execution to implement dynamic linking, but may be implemented in any desired computing or other language, notation, or format. In this manner, the rule may include any desired conditions or conditional or other expressions for linking the source and target data objects. The rule is preferably stored in a data store 130 and associated with the source data object (e.g., based on an identifier, metadata or other information, etc.).

The rules may establish links between various types of structured and unstructured data sources (e.g., various types of database management systems, databases, or other storage units employing structured schemas, Representational State Transfer (REST) access points, NOSQL databases, collections of files or data structures, etc.). In the case of unstructured data sources, the rule may need further information to identify the type of data desired (e.g., indicate patterns or other descriptors for identification of the desired data within the unstructured data source (e.g., data patterns or descriptions for address, telephone number, identification numbers, etc.)).

An example rule may include a conditional expression, "target.age>18". In this case, the conditional expression produces data records of target data objects with an age property value greater than 18. When a request for a corresponding source data object is received, the rule is executed (e.g., the computing language expression is executed, where a query is generated and sent to and processed by the target system similar to a procedure call on a Relational Database Management System (RDBM)) to retrieve corresponding data records of the target data object. The linked property of a data record of the source data object is resolved to zero or more data records of the target data object that satisfy the rule (e.g., the linked property of a data record of the source data object contains all data records from the target data object with an age property>18).

Another rule may include the conditional expression, "target['department'].indexOf("Clothing")>=0", where the conditional expression produces data records from the target data object with a department property value or name including the term "Clothing". The rules may specify any quantity of any desired conditions or conditional or other expressions (e.g., mathematical, logical, conditional, etc.) for retrieval of data records from target data objects. Accordingly, a dynamic join operation may be configured in design time with a programming type construct (e.g., JAVASCRIPT, etc.).

The rule creation may be accomplished in response to information entered by a user on a client system 114. By way of example, the rule may be entered in text form (e.g., in a JAVASCRIPT or other editor, text field, word processor, etc.). Alternatively, the rule may be provided graphically. In this case, when a link or connection is graphically entered (e.g., a line or connector is drawn) between source and target data objects as described above, a corresponding rule is generated in the appropriate format or textual form (e.g., JAVASCRIPT, etc.) for processing to dynamically link those data objects. The generated rule may be subsequently modified or edited with desired conditions or conditional or other expressions.

For example, a user interface screen 800 (FIG. 8) may be presented on client system 114 (e.g., via link module 38 and a computer system/server 12 of computing environment 50*a*, 50*b*) to establish a rule linking or connecting source and target data objects. User interface screen 800 may be provided for an application tool (e.g., provided by application tool module 36 and a computer system/server 12) or other scenario that utilizes the dynamic linking and access of present invention embodiments, and may be presented in response to selection of a desired link between source and target objects (e.g., from a list, text fields, graphical representations, etc.) and/or actuation of a graphical object representing a link between the data objects (e.g., connector 730 (FIG. 7)).

By way of example only, screen 800 includes a mode section 810 and a rules section 830. Mode section 810 includes a basic tab 815 and an advanced tab 820 to enable basic and advanced modes of entry for rules linking source and target data objects. The basic mode of entry presents a rule generated in response to graphically establishing a link between source and target data objects as described above. The advanced mode of entry enables direct entry of a rule for a desired link between source and target data objects and/or modification of entered or generated rules for corresponding links between the source and target data objects.

Figure 7:
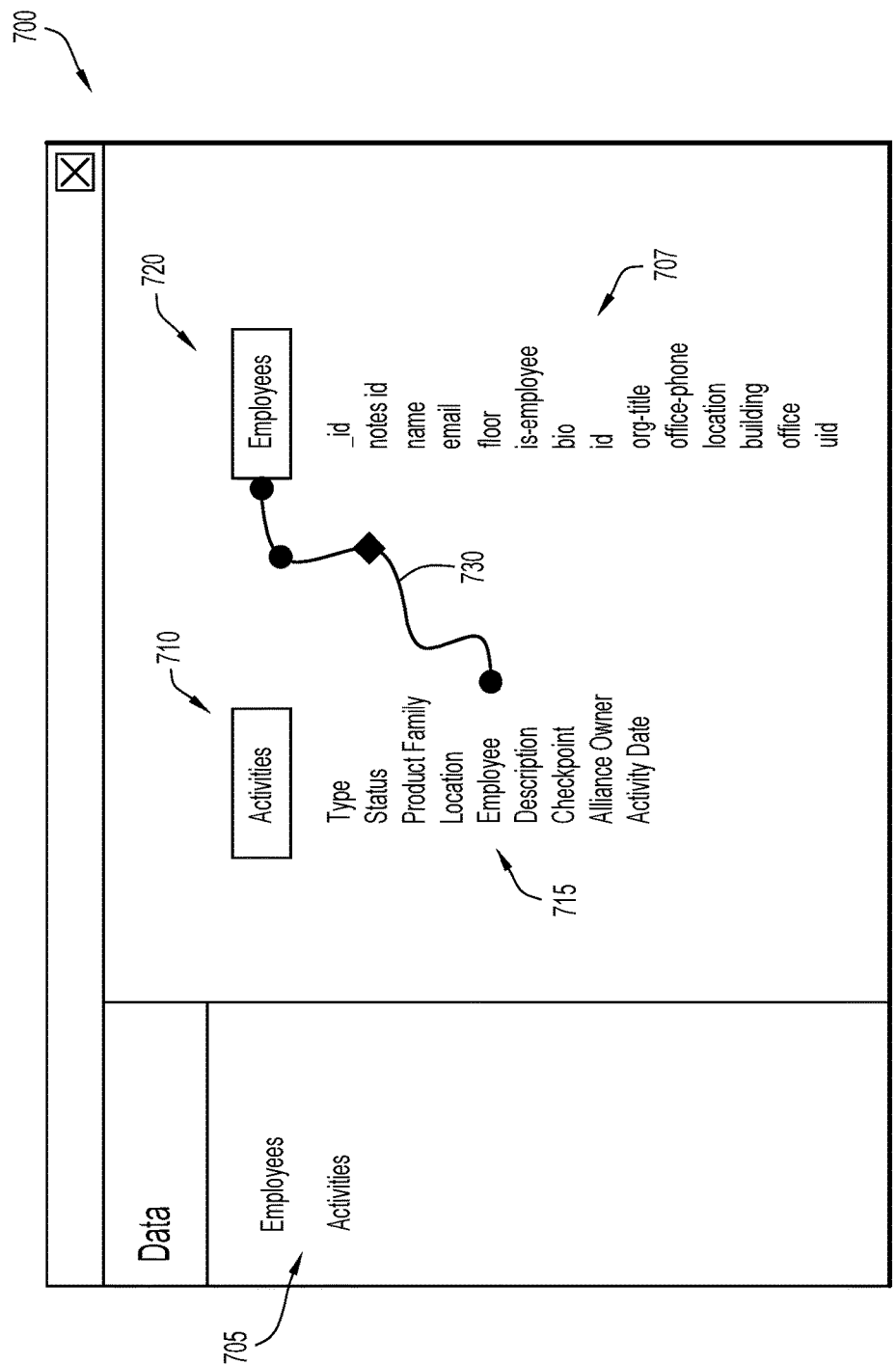
FIG. 7 is a schematic illustration of an example graphical user interface screen for linking an attribute of a source data object to data records of a target data object according to an embodiment of the present invention.
Figure 8:
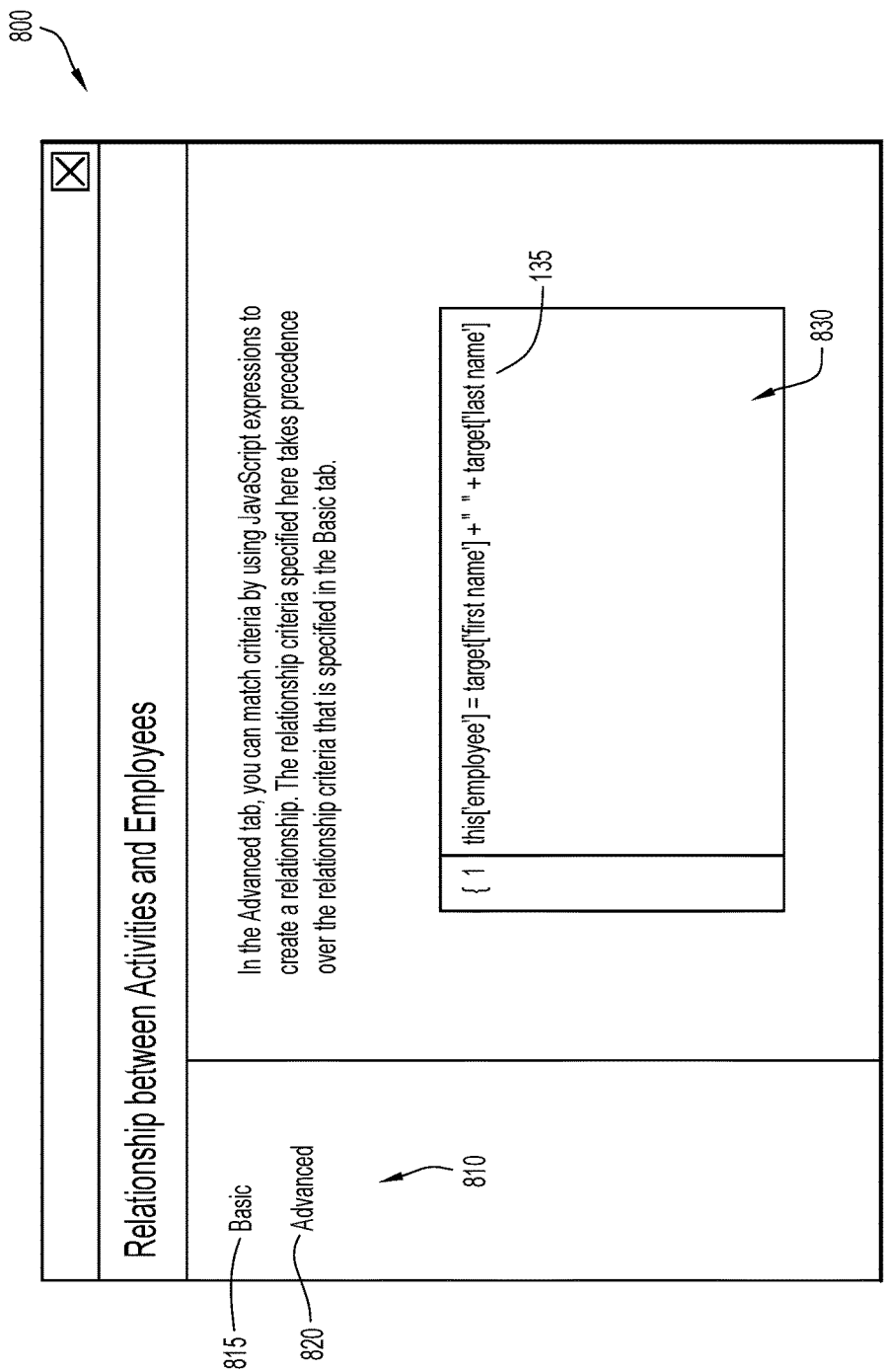
FIG. 8 is a schematic illustration of an example graphical user interface screen for establishing a rule for linking an attribute of a source data object to data records of a target data object according to an embodiment of the present invention.

Rules section 830 displays a rule 135 for a link between Employee property 715 of activities data object 710 and employees data object 720 (FIG. 7). Rule 135, by way of example, includes "this['Employee']=target['First-Name']+" "+target['LastName']" and is shown in the advanced mode of entry (e.g., via actuation of advanced tab 820). In this example case, the rule has been directly entered into rules section 830 in an advanced mode of entry (e.g., initially or by modification of a rule generated from graphically linking data objects as described above). This rule produces data records of employee data object 720 with the first and last names corresponding to the name in Employee property 715 of a data record of activities data object 710.

When a request for activity data object 710 is received, rule 135 is executed to retrieve corresponding data records of employees data object 720 (e.g., from the external registry or other data source of data or enterprise system 140) as described below. The linked Employee property of a data record of the activities data object is replaced or supplemented with one or more nested ones of retrieved data records of employees data object 720. The combined or merged data represents the results for the request as described below.

The rules may be changed at anytime (e.g., without the need to update an application or other requesting entity). In addition, since the rules are tied to source data objects, the data linking and access may be performed for any requests for those source data objects received from any requesting entities (e.g., any application, user, etc.).

Figure 9:
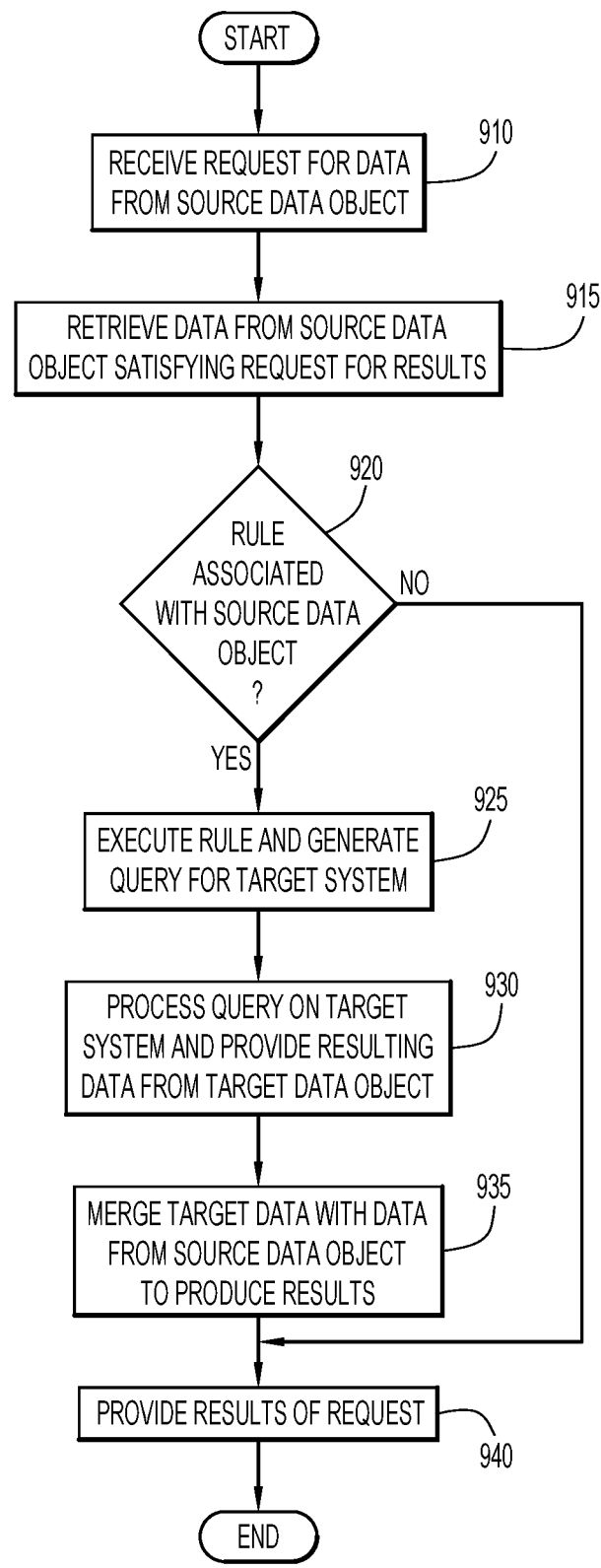
FIG. 9 is a procedural flowchart illustrating a manner of dynamically linking and accessing data of plural data objects for a data access operation according to an embodiment of the present invention.

Once the rules have been established, requests for data of the source data objects may be processed to provide results including data from the source data objects and data from the target data objects linked according to the associated rules. A manner of performing access operations with dynamic linking and access of plural data sources (e.g., via link module 38, a computer system/server 12 of computing environment 50*a*, 50*b*, and/or a client system 114) is illustrated in FIG. 9. In particular, a request for data of a source data object is received at step 910. The request may be from any requesting entity (e.g., an application (e.g., application 116 or other application local to or remote from the computer system/server 12) processing data of the requested data object, a user via a client system 114, etc.).

The request is processed to retrieve one or more data records from the source data object satisfying the request at step 915. In particular, computer system/server 12 of computing environment 50*a*, 50*b* identifies appropriate data stores 130 containing the requested data based on metadata or other information (e.g., that may reside within the request). The protocols to retrieve the requested data from the identified data stores are further determined based on a protocol definition (e.g., a Representational State Transfer (REST) call is utilized for a REST application programming interface (API) of a REST data source, a connection of an Open Database Connectivity (ODBC) type data store and a Structured Query Language (SQL) statement may be used for a Relational Database Management System (RDBMS), etc.)). The data is retrieved from the identified data stores utilizing the determined protocols, preferably stored in cache memory 32 of computer system/server 12 (FIG. 3), and formatted based on requirements of the requesting entity (e.g., to a format expected or compatible with the requesting application, user, etc.).

The presence of a rule associated with the requested source data object is determined at step 920. This may be accomplished by searching for the rule within data stores 130 based on the requested source data object (e.g., an identifier, metadata or other information, etc.). When a rule is absent for the requested source data object (e.g., indicating an absence of linked data from a target data object), the retrieved data is provided as the results for the request to the requesting entity (e.g., application, user, etc.) at step 940.

If a rule is present for the requested source data object as determined at step 920, the corresponding rule is retrieved and executed to perform dynamic linking and data access. For example, the rule may be in the form of a JAVASCRIPT or other computing language expression as described above, and may directly be executed in an environment provided by computer system/server 12 (e.g., a NODE.js or other environment that can directly execute compiled or uncompiled JAVASCRIPT or other computing language code) to retrieve linked data records from the target data object of data or enterprise system 140. Alternatively, the conditions or conditional or other expressions from the rule may be utilized to retrieve linked data records of the target data object from data or enterprise system 140.

In particular, execution of the rule includes generating a query or other data request for data or enterprise system 140 including the conditions or conditional or other expressions from the rule at step 925. The query may be in any desired form based on the type of data source employed by the data or enterprise system (e.g., a SQL or other query may be employed for a database, a REST call may be employed for a REST access point, etc.). The query is sent to and executed by data or enterprise system 140 to retrieve data records of the target data object satisfying the query at step 930 (e.g., similar to a procedure call on a Relational Database Management System (RDBM)). The generation and transmission of the query may be performed by the environment during direct execution of the computing or other language of the rule. Alternatively, link module 38 (e.g., via a computer system/server 12) may analyze the rule, generate the query based on the conditions or conditional or other expressions within the rule, and send the query to the data or enterprise system to retrieve the associated data records of the target data object.

The data records of the target data object satisfying the query are returned by the data or enterprise system to the corresponding computer system/server 12, where the data records of the target data object are merged with the data record retrieved from the source data object at step 935 to produce results for the request. The results including data from the source and target data objects are provided as the results for the request to the requesting entity (e.g., application, user, etc.) at step 940.

For example, a request may be received for a data record of activities data object 710 (FIG. 7) residing in a data store 130. Employee property 715 of activities data object 710 is linked to employee data object 720 of data or enterprise system 140, and has an associated rule 135 (FIG. 8) as described above. Rule 135, by way of example, includes "this['Employee']== target['FirstName']+" "+ target['LastName']". This rule produces data records 142 of employee data object 720 with the first and last names corresponding to the name in Employee property 715 of data records of activities data object 710. A data record of activities data object 720 satisfying the request is initially retrieved from data store 130 and includes Employee property 715 with a particular employee name. The associated rule is executed, and a query including the particular employee name is generated and sent to data or enterprise system 140 to retrieve data records of employee data object 720 containing that name and additional employee information.

The resulting data records of employee data object 720 are embedded into the Employee property 715 of the initial data record of activities data object 710 to form the results for the request as illustrated, by way of example, in FIG. 10. Specifically, a user interface screen 1000 is presented on a client system 114 (e.g., via link module 38 and a computer system/server 12). User interface screen 1000 may be provided for an application tool (e.g., provided by application tool module 36 and a computer system/server 12 of computing environments 50a, 50b) or other scenario that utilizes the dynamic linking and access of present invention embodiments, and may be presented in response to selection of the screen (e.g., from a list, text fields, graphical representations, etc.) and/or transmission of a data request. User interface screen 1000 includes a record section 1010 displaying the resulting data satisfying the request (e.g., an initial data record of activities data object 710 satisfying the request with zero or more data records of employees data object 720 embedded therein). For example, a data record of employee data object 720 that satisfies the associated rule (e.g., contains the name in the Employee property of the initial data record) is embedded into Employee property 715 of the initial data record of activities data object 710 as shown in an area 1020 of user interface screen 1000.

Thus, the results provide information from data records of both the activities and employee data objects based on a request for data records of the activities data object. This enables records of the activities data object to be provided with additional information absent from data stores 130. For example, the initial data record of activities data object 710 may simply include limited employee information. However, the dynamic linking and access of present invention embodiments provides that initial data record satisfying the request with the additional employee information from data or enterprise system 140. Data access operations or functionality of the computer system/server for activities data object 710 have been altered and enhanced to provide information (e.g., data records of employees data object 720) beyond the information that would be returned from a typical request for the activities data object.

It will be appreciated that the embodiments described above and illustrated in the drawings represent only a few of the many ways of implementing embodiments for providing an access operation with dynamic linking and access of data within plural data sources.

The computing environments of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, link module, application tool module, etc.). These systems may include any types of monitors and input devices (e.g., keyboard, mouse, voice recognition, etc.) to enter and/or view information.

It is to be understood that the software (e.g., link module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., link module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The computing system may employ any number of any conventional or other databases, data stores or storage structures (e.g., files, databases, data structures, data or other repositories, etc.) to store information (e.g., data objects, rules, etc.). The data stores may be implemented by any number of any conventional or other databases, data stores or storage structures (e.g., files, databases, data structures, data or other repositories, etc.) to store information (e.g., data objects, rules, etc.). The data stores may be included within or coupled to the server and/or client systems. The data stores and/or storage structures may be remote from or local to the computer or other processing systems.

The source and target data stores may be of any suitable type of data storage unit (e.g., database, data store, etc.) for structured or unstructured data, and may be accessed via any suitable protocol (e.g., REST, LDAP, ODBC, etc.). The data stores may contain any suitable data objects for linking (e.g., data records, tables, fields, attributes, properties, etc.), and store any desired or type of information. A data object or collection may include any quantity of any properties or attributes of any type (e.g., character or string, numeric, alphanumeric, etc.) and any quantity of data records or other data elements having any values for those properties.

The associations or links may be of any quantity, may be entered (e.g., by a user, application, importation of data, etc.) in any fashion (e.g., textual, graphically, etc.), and may link any quantity of any portions of any data objects (e.g., a source field to a target record or one or more particular target record fields, a source record to a target record, etc.).

The rules may be of any quantity, entered (e.g., by a user, application, importation of data, etc.) in any fashion (e.g., textual, graphically, etc.), and may link any quantity of any portions of any data objects (e.g., a source field to a target record or one or more particular target record fields, a source record to a target record, etc.). The rules may be expressed in any computing or other language code (e.g., JAVASCRIPT, etc.), format, and/or notation, and include any quantity of conditions and/or conditional or other expressions (e.g., conditional (e.g., equal to, greater than, greater than or equal to, less than, less than or equal to, etc.), mathematical, logical, etc.). The rules may include any quantity of any values (e.g., constants, source and/or target property values, variables, system or other parameters, etc.) and operators (e.g., mathematical, logical, conditional, etc.) arranged in any fashion. The rules may be associated with the links and/or the source and/or target data objects in any suitable manner (e.g., identifiers, metadata or other information, etc.).

Any quantity of rules may be associated with data objects or any portions of the data objects. For example, one or more properties of a source data object may each include the same or a different rule linking that property to a corresponding target data object (or a portion thereof). The rules may link the source data object to a plurality of target data objects of the same or different data sources. Each rule is executed to retrieve data from each of the linked target data objects for merging in the source data object at any desired locations. Thus, a source data object may receive data from a plurality of different data sources, where the resulting data may include, for each property of a source data record, data from the same or different target data object from the same or different target data sources according to the associated rules.

The rule may be retrieved and executed in any suitable fashion. For example, the rule may be implemented in a computing or other language (e.g., JAVASCRIPT, etc.) and be directly executed in compiled, uncompiled, or other form (e.g., within an environment or platform that can execute compiled, uncompiled, or other code) to retrieve data from a target data object. Alternatively, information within the rule may be extracted (e.g., conditions, expressions, etc.) and utilized to generate a query or other data request to retrieve data from the target data object in accordance with the rule. Further, a request for a source data object may be detected in any suitable fashion to trigger execution of the rule (e.g., monitoring calls, monitoring data accesses of the source data objects, etc.).

The rules may be triggered in response to any request, access, and/or retrieval of a source and/or target data object from any requesting entity (e.g., any applications, users, interfaces, etc.). In addition, the links and/or rules may be changed at any desired times to indicate varying preferences for target data objects (e.g., modified conditions, different target data objects and/or sources, etc.). This enables the data linking and access to be modified without changes to requesting entities (e.g., applications, interfaces, etc.).

The data from the target data object may be merged with the source data object in any suitable fashion (e.g., any quantity of retrieved data records from the target data objects may be embedded within any properties or fields of the source data record, the data records of the target data objects may be inserted or appended at any locations within the source data record, the locations for the target data records may be specified, additional fields or properties may be created within the source data record at any locations for data records of the target data objects, etc.). The resulting data may be formatted in any manner expected by a requesting entity (e.g., application, interface, user, etc.). The formatting may be specified in any desired manner (e.g., within a request, based on a protocol, metadata, or other information, etc.).

The present invention embodiments may employ any number of any type of user interface (e.g., Graphical User Interface (GUI), command-line, prompt, etc.) for obtaining or providing information (e.g., requests, requested data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., requested data, etc.).

The present invention embodiments are not limited to the specific tasks or algorithms described above, but may be utilized for any access of data from an initial data source to provide additional or supplemental information from one or more other data sources.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of accessing data comprising:
   creating, via a processor, a rule including one or more conditional expressions to link an attribute of a first data object of a first data source to a second data object of a second data source, wherein the first data object includes one or more first attributes for data of the first data object and a plurality of first data records with values for the first attributes, wherein the second data object includes one or more second attributes for data of the second data object and a plurality of second data records with values for the second attributes, wherein the one or more conditional expressions identify at least one specific second data record for the linked attribute of the first data object, and wherein the second data source is external of the first data source;
   retrieving, via a processor, data of the first data object from the first data source in accordance with a request for the first data object, wherein the data of the first data object retrieved from the first data source includes one or more of the first data records;
   processing the rule, via a processor, in response to retrieving the data of the first data object to retrieve data of the second data object from the second data source, wherein the data of the second data object retrieved from the second data source includes one or more of the second data records satisfying the one or more conditional expressions of the rule; and
   producing, via a processor, results for the request for the first data object by inserting the second data records of the data of the second data object retrieved from the second data source into the first data records of the data of the first data object retrieved from the first data source at a location corresponding to the linked attribute of the first data object.

2. The method of claim 1, wherein the rule is expressed in computing language code.

3. The method of claim 2, wherein processing the rule further comprises:
   executing the computing language code of the rule to retrieve the data of the second data object from the second data source.

4. The method of claim 1, wherein processing the rule further comprises:
   generating a query for the second data source based on the rule to retrieve data of the second data object satisfying the one or more conditional expressions of the rule.

5. The method of claim 1, wherein creating a rule further comprises:
   specifying an association between the attribute of the first data object and the second data object; and
   creating the rule including the one or more conditional expressions for the association to link the attribute of the first data object to the second data object.

6. The method of claim 1, wherein the first and second data sources collectively include at least one unstructured data source.

7. The method of claim 1, wherein the first data source includes a local data store and the second data source includes an external data store.

8. A system for accessing data comprising:
   at least one processor configured to:
      create a rule including one or more conditional expressions to link an attribute of a first data object of a first data source to a second data object of a second data source, wherein the first data object includes one or more first attributes for data of the first data object and a plurality of first data records with values for the first attributes, wherein the second data object includes one or more second attributes for data of the second data object and a plurality of second data records with values for the second attributes, wherein the one or more conditional expressions identify at least one specific second data record for the linked attribute of the first data object, and wherein the second data source is external of the first data source;
      retrieve data of the first data object from the first data source in accordance with a request for the first data object, wherein the data of the first data object retrieved from the first data source includes one or more of the first data records;
      process the rule in response to retrieving the data of the first data object to retrieve data of the second data object from the second data source, wherein the data of the second data object retrieved from the second data source includes one or more of the second data records satisfying the one or more conditional expressions of the rule; and
      produce results for the request for the first data object by inserting the second data records of the data of the second data object retrieved from the second data source into the first data records of the data of the first data object retrieved from the first data source at a location corresponding to the linked attribute of the first data object.

9. The system of claim 8, wherein the rule is expressed in computing language code.

10. The system of claim 9, wherein processing the rule further comprises:
   executing the computing language code of the rule to retrieve the data of the second data object from the second data source.

11. The system of claim 8, wherein processing the rule further comprises:
   generating a query for the second data source based on the rule to retrieve data of the second data object satisfying the one or more conditional expressions of the rule.

12. The system of claim 8, wherein creating a rule further comprises:
   specifying an association between the attribute of the first data object and the second data object; and
   creating the rule including the one or more conditional expressions for the association to link the attribute of the first data object to the second data object.

13. The system of claim 8, wherein the first and second data sources collectively include at least one unstructured data source.

14. The system of claim 8, wherein the first data source includes a local data store and the second data source includes an external data store.

15. A computer program product for accessing data comprising:
   a computer readable storage medium having computer readable program code embodied therewith, the computer readable program code comprising computer readable program code configured to:
   create a rule including one or more conditional expressions to link an attribute of a first data object of a first data source to a second data object of a second data source, wherein the first data object includes one or more first attributes for data of the first data object and a plurality of first data records with values for the first attributes, wherein the second data object includes one or more second attributes for data of the second data object and a plurality of second data records with values for the second attributes, wherein the one or more conditional expressions identify at least one specific second data record for the linked attribute of the first data object, and wherein the second data source is external of the first data source;
   retrieve data of the first data object from the first data source in accordance with a request for the first data object, wherein the data of the first data object retrieved from the first data source includes one or more of the first data records;
   process the rule in response to retrieving the data of the first data object to retrieve data of the second data object from the second data source, wherein the data of the second data object retrieved from the second data source includes one or more of the second data records satisfying the one or more conditional expressions of the rule; and
   produce results for the request for the first data object by inserting the second data records of the data of the second data object retrieved from the second data source into the first data records of the data of the first data object retrieved from the first data source at a location corresponding to the linked attribute of the first data object.

16. The computer program product of claim 15, wherein the rule is expressed in computing language code.

17. The computer program product of claim 16, wherein processing the rule further comprises:
   executing the computing language code of the rule to retrieve the data of the second data object from the second data source.

18. The computer program product of claim 15, wherein processing the rule further comprises:
   generating a query for the second data source based on the rule to retrieve data of the second data object satisfying the one or more conditional expressions of the rule.

19. The computer program product of claim 15, wherein creating a rule further comprises:
   specifying an association between the attribute of the first data object and the second data object; and
   creating the rule including the one or more conditional expressions for the association to link the attribute of the first data object to the second data object.

20. The computer program product of claim 15, wherein the first and second data sources collectively include at least one unstructured data source.

21. The computer program product of claim 15, wherein the first data source includes a local data store and the second data source includes an external data store.

* * * * *